United States Patent
Lee et al.

(10) Patent No.: US 8,559,409 B2
(45) Date of Patent: Oct. 15, 2013

(54) METHOD AND SYSTEM FOR MANAGING MOBILE ROUTER IN PROXY MOBILE INTERNET PROTOCOL VERSION 6 DOMAIN

(75) Inventors: Joo Chul Lee, Daejeon (KR); Hyoung Jun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 788 days.

(21) Appl. No.: 12/670,162

(22) PCT Filed: Jun. 19, 2008

(86) PCT No.: PCT/KR2008/003472
§ 371 (c)(1),
(2), (4) Date: Jan. 22, 2010

(87) PCT Pub. No.: WO2009/014318
PCT Pub. Date: Jan. 29, 2009

(65) Prior Publication Data
US 2010/0189037 A1   Jul. 29, 2010

(30) Foreign Application Priority Data

Jul. 25, 2007   (KR) .................. 10-2007-0074452

(51) Int. Cl.
*H04W 4/00*   (2009.01)
(52) U.S. Cl.
USPC ............................ 370/338; 370/315; 370/389
(58) Field of Classification Search
USPC .................................................. 370/310–350
See application file for complete search history.

(56) References Cited

U.S. PATENT DOCUMENTS

| | | | |
|---|---|---|---|
| 2006/0239254 A1* | 10/2006 | Short et al. ................... | 370/352 |
| 2007/0230410 A1* | 10/2007 | Thubert et al. ................ | 370/338 |
| 2008/0207206 A1* | 8/2008 | Taniuchi et al. .............. | 455/436 |
| 2008/0310323 A1* | 12/2008 | Shirota et al. ................. | 370/254 |
| 2009/0016364 A1* | 1/2009 | Krishnan ...................... | 370/401 |
| 2009/0207821 A1* | 8/2009 | Rune ............................. | 370/338 |
| 2009/0313680 A1* | 12/2009 | Hirano ............................. | 726/3 |
| 2010/0202357 A1* | 8/2010 | Kim et al. ..................... | 370/328 |

FOREIGN PATENT DOCUMENTS

| | | |
|---|---|---|
| KR | 1020050044387 A | 5/2005 |
| KR | 1020050065990 A | 6/2005 |
| KR | 1020060098891 A | 9/2006 |

OTHER PUBLICATIONS

Gundavelli et al. ("Proxy Mobile Ipv6," draft-sgundave-mip6-proxymip6-00) , Oct. 16, 2006, pp. 1-22.*
Leung et al ("Proxy Mobile Ipv6," draft-sgundave-mip6-proxymip6-02), Mar. 5, 2007, pp. 1-50.*

(Continued)

*Primary Examiner* — Andrew Chriss
*Assistant Examiner* — Kenan Cehic
(74) *Attorney, Agent, or Firm* — Ladas & Parry LLP

(57) ABSTRACT

A system for managing mobile routers connected to a PMIP6 (proxy mobile internet protocol version 6) domain is provided with a plurality of MAGs (mobility access gateways) to which the mobile routers are to be connected, an LMA (local mobility anchor), connected to the plurality of MAGs, for managing location information of the mobile routers and packet forwarding information of the mobile routers, and a profile server in which profile information of the mobile routers is registered. Further, the plurality of MAGs and the LMA set up forwarding information of a home prefix of a mobile router that is connected to the PMIP6 domain and a mobile network prefix managed by the connected mobile router, based on the profile information of the mobile routers registered in the profile server.

7 Claims, 4 Drawing Sheets

(56) References Cited

OTHER PUBLICATIONS

Devarapalli et al., (Network Mobility (NEMO) Basic Support Protocol), Jan. 2005, pp. 1-33.*

S. Gundavelli, et al; "Proxy Mobile IPv6" IETF—Internet-Draft(draft-ietf-netlmm-proxymip6-01), Jun. 18, 2007, pp. 1-50.

G. Giaretta, "Interactions between PMIPv6 and MIPv6: scenarios and related issues", IETF Internet-Draft(draft-giaretta-netlmm-mip-interactions-01), Jul. 6, 2007, pp. 1-16.

J.C. Lee, et al; NEMO in PMIPv6 domain(draft-lee-netlmm-nemo-ps-01.txt), Network Working Group Internet-Draft ETRI, Aug. 7, 2007, pp. 1-14.

International Search Report: PCT/KR2008/003472.

* cited by examiner

METHOD AND SYSTEM FOR MANAGING MOBILE ROUTER IN PROXY MOBILE INTERNET PROTOCOL VERSION 6 DOMAIN

TECHNICAL FIELD

The present invention claims priority of Korean Patent Application No. 10-2007-0074452, filed on Jul. 25, 2007, which is incorporated herein by reference.

The present invention relates to a method and system for managing a mobile router in a PMIP6 (Proxy Mobile IPv6) domain.

This work was supported by the IT R&D program of MIC/IITA. [2007-P10-027, Development of Next Generation Network Standards for IPv6 based Mobility Support]

BACKGROUND ART

One of the key issues associated with mobility management of recent mobile terminals is a network-based mobility support protocol. Most terminals are equipped with an existing mobility management protocol such as MIP (mobile IP), accordingly, the terminal is required to be modified. Such drawback is one of the major reasons why the existing mobility management protocol has not been widely applied in the meantime.

On the contrary, the network-based mobility support protocol has the advantage of not asking for any modification of a mobile terminal because the mobility management of the terminal is handled by the network side.

Meanwhile, the IETF (Internet Engineering Task Force), which is currently an international standard organization for developing and promoting Internet-related protocol standards, has established the NETLMM (Network-based Localized Mobility Management) WG to standardize a network-based mobility support protocol. For example, PMIP6 that is adopted and now under development by the NETLMM WG is a protocol expanded from the existing MIP6 protocol to conform to the specifications of a network-based mobility support protocol.

Hereinafter, the structure of a conventional PMIP6 domain will be described with reference to FIG. 1.

FIG. 1 shows the structure of a conventional PMIP6 domain. As shown in FIG. 1, the PMIP6 domain structure is largely constituted by a mobile node 100, MAGs (Mobility Access Gateways) 102aa, 102bb, and 102 cc, an LMA (Local Mobility Anchor) 104, and a profile server 106.

The LMA 104 is connected to the Internet network, and maintains location information of which MAG in the PMIP6 domain the mobile node 100 currently belongs to, and packet forwarding information.

The MAGs 102a, 102b, and 102c are the ones that practically perform the mobility management on behalf of the mobile node 100. More specifically, the MAGs 102a, 102b, and 102c serve to detect whether the mobile node 100 is connected to or departed from a subnet under their own management, and provide the LMA 104 with the current location information of the mobile node 100 and the packet forwarding information.

The profile server 106 manages profile information of the mobile node 100, and offers the profile information of the mobile node 100 at a request for the profile information from the MAGs 102a, 102b, and 102c.

A description of how a mobile node is connected to a PMIP6 domain with the structure above and of how the mobile node moves within the domain will follow with reference to FIG. 2 and FIG. 3.

FIG. 2 illustrates a connection procedure of the mobile node to the PMIP6 domain shown in FIG. 1.

First of all, when the mobile node 100 is connected to the MAG 102a in step S200, the MAG 102a requests the profile server 106 to provide profile information of the mobile node 100 (i.e., mobile terminal), and receives the profile information from the profile server 106 in step S202. The profile information contains prefix information of the mobile node 100 (including home prefix thereof).

When the connection of the mobile node 100 to the MAG 102a is detected, the MAG 102a sends a BU (Binding Update) message to the LMA 104 in step S204. The BU message contains the prefix information of the mobile node 100 provided from the profile server 106.

The LMA 104 that receives the BU message sets up forwarding information for the mobile node 100 by using the prefix information contained in the BU message, and then sends a BA (Binding Acknowledge) message to the MAG 102a in step S206.

Next, the MAG 102a that receives the BA message establishes a tunnel using itself and the LMA 104 as both endpoints, and then sets up forwarding information of the mobile terminal based on the prefix information in step S208.

FIG. 3 illustrates how a mobile node moves within the PMIP6 domain depicted in FIG. 1.

First, when the mobile node 100 connected to the MAG 102a moves to a coverage area of the MAG 102b in step S300, steps S200 through S208 shown in FIG. 2 are performed to establish a tunnel between the LMA 104 and the MAG 102b, and forwarding information of the mobile node 100 is then set up based on the prefix information in step S302.

When the movement of the mobile node 100 from the MAG 102a to the MAG 102b has been completed, the LMA 104 sends a message for de-registration of a home prefix of the mobile node 100 to the MAG 102a.

Through this procedure, the mobility management for the mobile node within the PMIP6 domain is performed. Since the MAGs 102a, 102b, and 102c associated with one LMA 104 in the PMIP6 domain advertise the same home prefix to the mobile node 100, the movement among them is regarded transparent to the mobile node as if it moved on a single link.

As explained so far, the conventional PMIP6 provides mobility without requiring any modification on the mobile terminal (i.e. mobile node) side. One of operational features of the PMIP6 is that when a mobile terminal is connected to a specific MAG of a PMIP6 domain, the MAG is connected to the profile server to obtain profile information of the mobile terminal. This profile contains a home prefix of the mobile terminal, which is used for the MAG to identify a mobile terminal packet that will be transmitted to the LMA.

However, such a home prefix is merely the prefix information of the mobile terminal (mobile node)'s own address. Therefore, in case where a mobile node is a mobile router and a PMIP6 domain is used as a home network for the mobile router, there is no method to process a mobile network prefix including the address of a node that belongs to the mobile network managed by the mobile router.

DISCLOSURE OF INVENTION

Technical Problem

It is, therefore, a primary object of the present invention to provide a mobile router management method and system for supporting communications of a node that belongs to a mobile network when a PMIP6 domain is used as the home network of a mobile router.

Technical Solution

In accordance with a first aspect of the present invention, there is provided a system for managing mobile routers connected to a PMIP6 (proxy mobile interne protocol version 6) domain, including: a plurality of MAGs (mobility access gateways) to which the mobile routers are to be connected; an LMA (local mobility anchor), connected to the plurality of MAGs, for managing location information of the mobile routers and packet forwarding information of the mobile routers; and a profile server in which profile information of the mobile routers is registered, wherein the plurality of MAGs and the LMA set up forwarding information of a home prefix of a mobile router that is connected to the PMIP6 domain and a mobile network prefix managed by the connected mobile router, based on the profile information of the mobile routers registered in the profile server.

In accordance with a second aspect of the present invention, there is provided A method for managing mobile routers in a PMIP6 (proxy mobile internet protocol version 6) domain, including: registering profile information in a profile server, the profile information containing mobile network prefixes managed by mobile routers; when an arbitrary mobile router is connected to an arbitrary MAG (mobility access gateway) within the PMIP6 domain, providing profile information of the connected mobile router from the profile server to the MAG; extracting a mobile network prefix from the profile information, and providing a registration message containing the mobile network prefix from the MAG to an LMA (local mobility anchor), for registering the mobile network prefix; setting up, at the LMA, forwarding information of a mobile network managed by the mobile router, and sending a response message from the LMA to the MAG; and establishing a tunnel between the MAG that receives the response message and the LMA, and setting up forwarding information of the mobile network.

BRIEF DESCRIPTION OF THE DRAWINGS

The objects and features of the present invention will become apparent from the following description of preferred embodiments, given in conjunction with the accompanying drawings, in which.

MODE FOR THE INVENTION

Hereinafter, embodiments of the present invention will be described in detail with reference to the accompanying drawings.

Figure 1:
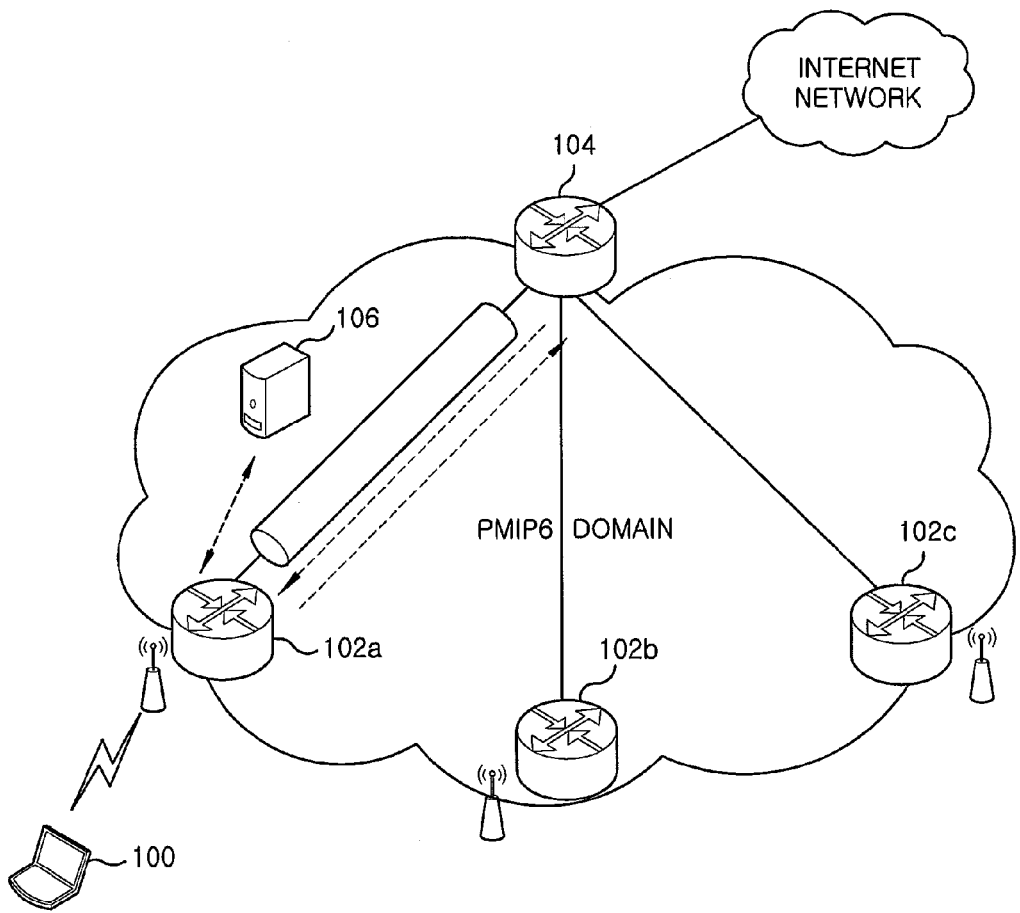
FIG. 1 shows the structure of a conventional PMIP6 domain.
Figure 2:
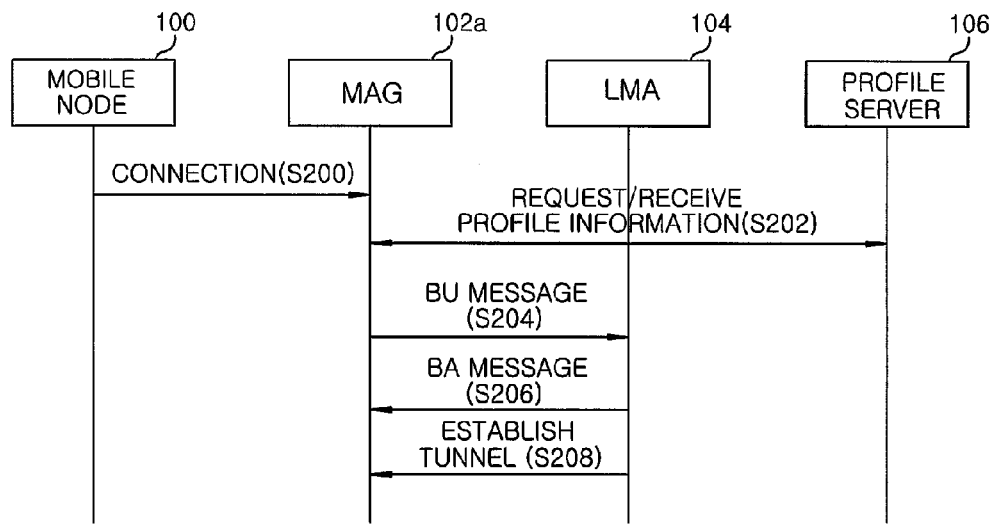
FIG. 2 illustrates a connection procedure of a mobile node to the PMIP6 domain shown in FIG. 1.
Figure 3:
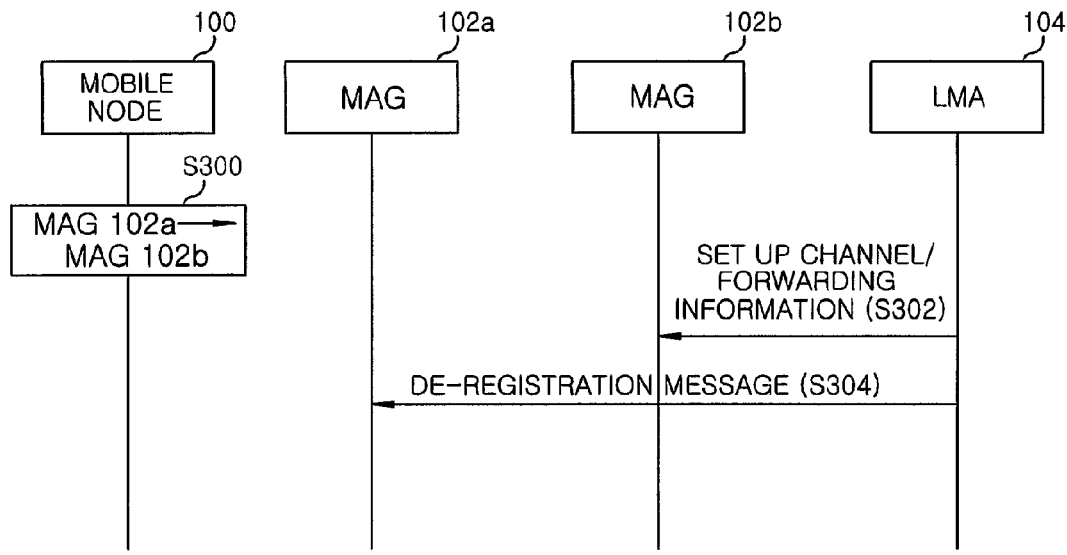
FIG. 3 describes how a mobile node moves from an arbitrary MAG to another MAG within the PMIP6 domain depicted in FIG. 1.
Figure 4:
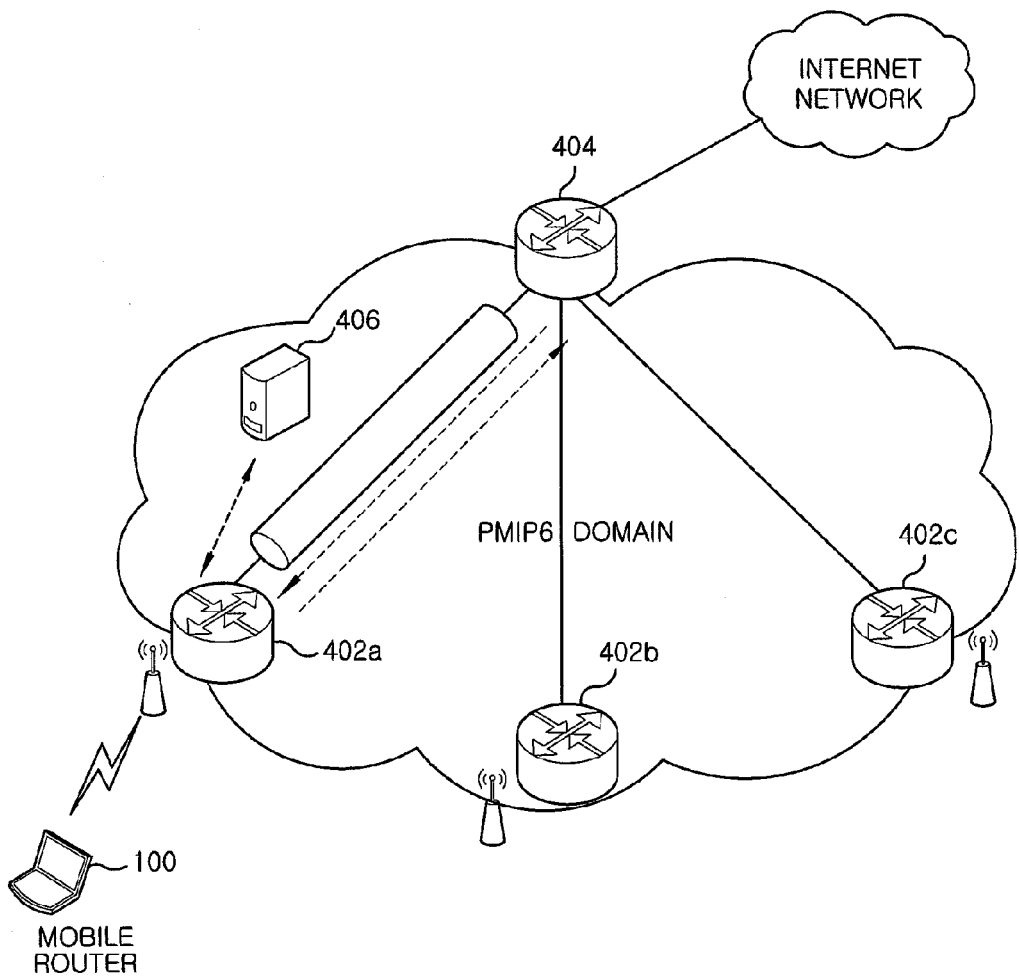
FIG. 4 illustrates the structure of a PMIP6 domain to explain a mobile router management system, in accordance with a preferred embodiment of the present invention.

FIG. 4 illustrates a PMIP6 domain structure to explain a mobile router management system in a PMIP6 domain, in accordance with a preferred embodiment of the present invention. As shown in FIG. 4, the PMIP6 domain of the present invention includes a mobile router 400, a plurality of MAGs 402a, 402b, and 402c to which the mobile router 400 is connected, an LMA 404 connected to the MAGs 402a, 402b, and 402c, and a profile server 406.

The profile server 406 contains profile information registered therein, of a plurality of mobile nodes, e.g., mobile terminals, and mobile routers 400, connected to the PMIP6 domain. If a mobile node is a mobile terminal, the profile information will contain a home prefix of the mobile terminal. Meanwhile, in case the mobile node is the mobile router 400, the profile information will contain a home prefix of the mobile router 400 and prefix information of a mobile network.

Based on the profile information of the mobile routers 400 registered in the profile server 406, the MAGs 402a, 402b, and 402c and the LMA 404 can set up forwarding information of the home prefix of the mobile router 400 that is connected to the PMIP6 domain and forwarding information of a mobile network prefix managed by the connected mobile router 400. Here, the home prefix of the mobile router 400 can be address information allocated to the mobile router itself, and the mobile network prefix can be address information of plural nodes connected to the mobile router 400.

Each of the MAGs 402a, 402b, and 402c includes means for receiving the profile information of a connected mobile node from the profile server 406 and determining whether a mobile node is the mobile router 400 or a mobile terminal; means for sending, if the mobile node is the mobile router 400, a BU message which is a registration message for registering a home prefix of the mobile router 400 and a mobile network prefix in the LMA based on the profile information provided from the profile server 406; means for setting up forwarding information of the home prefix of the mobile router 400 and the mobile network prefix based on the profile information; and means for establishing a tunnel with the LMA 404 when a BA message as a response to the BU message is received from the LMA 404.

The LMA 404 sets up forwarding information of the home prefix of the mobile router 400 and the mobile network prefix based on the BU message provided from the MAGs 402a, 402b and 402c, and, then, sends a BA message to the MAGs 402a, 402b, and 402c.

Further, when the mobile router 400 moves from one MAG to another MAG within the PMIP6 domain, for example, from MAG 402a to MAG 402b, the LMA 404 sends a de-registration message to the MAG 402a in order to deregister the home prefix of the mobile router 400 and the mobile network prefix set up therein.

From now on, a method for managing mobile routers in the PMIP6 domain structure with the configuration above will be described in detail with reference to FIG. 5 and FIG. 6.

Figure 5:
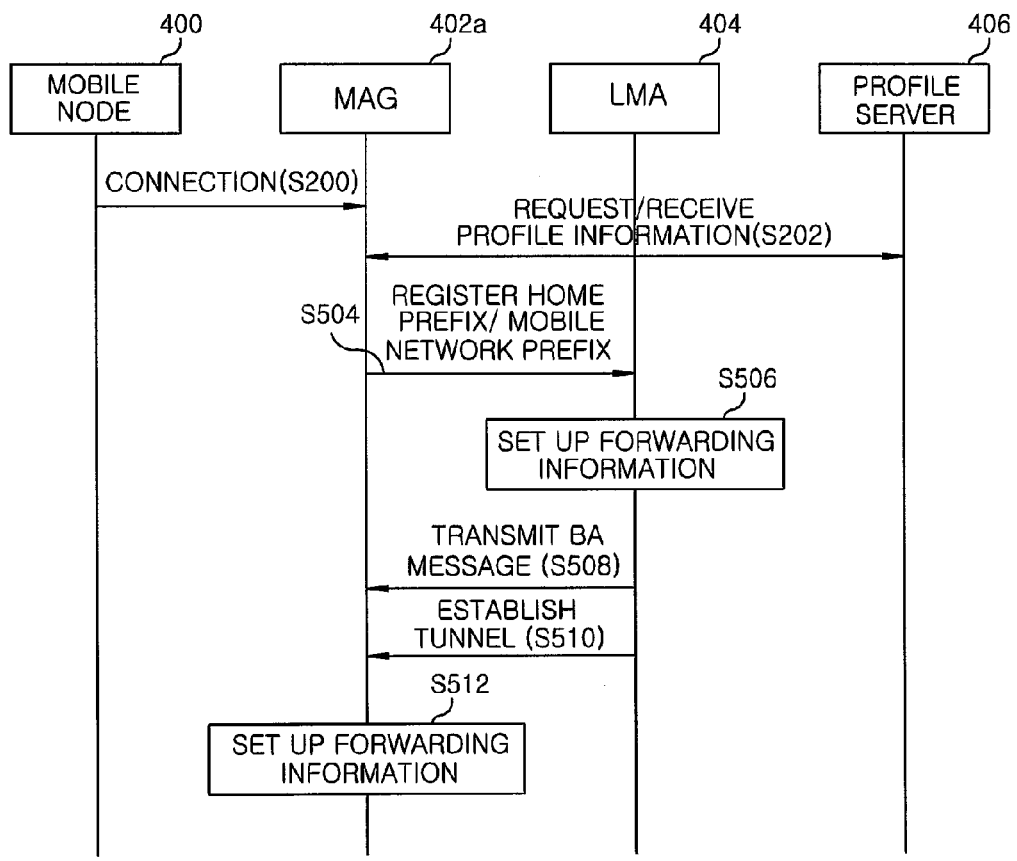
FIG. 5 presents a connection procedure of a mobile router to the PMIP6 domain of FIG. 4.

FIG. 5 illustrates a connection procedure of a mobile router to the PMIP6 domain of FIG. 4.

Referring to FIG. 5, a mobile router 400 first makes a connection to any MAG, for example, MAG 402a in step S500. Then, the MAG 402a requests the profile server 406 to provide profile information of the mobile router 400, and receives the profile information accordingly in step S502.

Based on the profile information, the MAG 402a recognizes that a connected mobile node is the mobile router 400, and sends the home prefix of the mobile router 400 and the mobile network prefix contained in the profile information to the LMA 404 for registration in step S504. Here, the registration of the home prefix of the mobile router 400 and the mobile network prefix is achieved by using a BU message, which is a registration message.

The LMA 404 that receives the BU message sets up forwarding information for the mobile router 400 and the mobile network based on the home prefix of the mobile router 400 and the mobile network prefix contained in the BU message in step S506. That is, it sets up forwarding information for the home prefix of the mobile router 400 and for the mobile network prefix.

Next, the LMA 404 that has set up the forwarding information sends a BA message, which is a response to the BU message, to the MAG 402a in step S508. Upon receipt of the BA message, the MAG 402a establishes a tunnel using itself and the LMA 404 as both end-points in step S510, and, based on the home prefix and the mobile network prefix obtained in step S502, sets forwarding information of the mobile router 400 and the mobile network managed by the mobile router 400 in step S512.

In accordance with the present invention, the forwarding information of the mobile router 400 and the mobile network is set up on the basis of the home prefix of the mobile router 400 and the mobile network prefix registered in the profile server 406. Thus, there is no problem in processing even when the mobile router 400 is connected to the PMIP6 domain.

Figure 6:
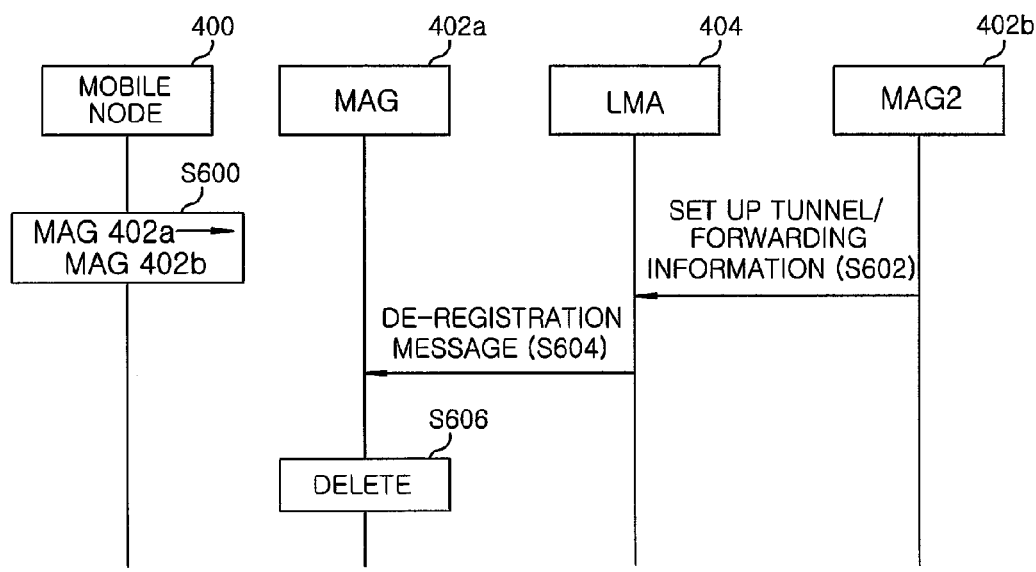
FIG. 6 describes how a mobile router moves from an arbitrary MAG to another MAG within the PMIP6 domain of FIG. 4.

FIG. 6 illustrates how a mobile router moves from a certain MAG to another MAG within the PMIP6 domain of FIG. 4.

Referring to FIG. 6, when the mobile router 400 connected to the MAG 402a moves to a coverage area of the MAG 402b in step S600, the MAG 402b requests the profile server 406 to provide profile information of the mobile router 400 and receives the profile information accordingly. Next, steps S504 to 5512 shown in FIG. 5 are performed to set up forwarding information and a tunnel in step S602.

To be more specific, in step S602, the MAG 402b sets up forwarding information, on the basis of the home prefix of the mobile router 400 and the mobile network prefix information obtained from the profile information. Moreover, when a BA message is received as a response message from the LMA 404, the MAG 402b establishes a tunnel connecting the LMA 404 and itself as both end-points.

Meanwhile, the LMA 404 receives from the MAG 402b a BU message containing information of the home prefix of the mobile router 400 and the mobile network prefix to set up forwarding information, and then sends the BA message as a response message to the MAG 402b.

Thereafter, the LMA 404 sends a de-registration message to the MAG 402a to deregister the home prefix of the mobile router 400 and the mobile network prefix registered therein in step S604.

The MAG 402a that receives the de-registration message deletes the home prefix of the mobile router 400 and the mobile network prefix in step S606.

Figure 7:
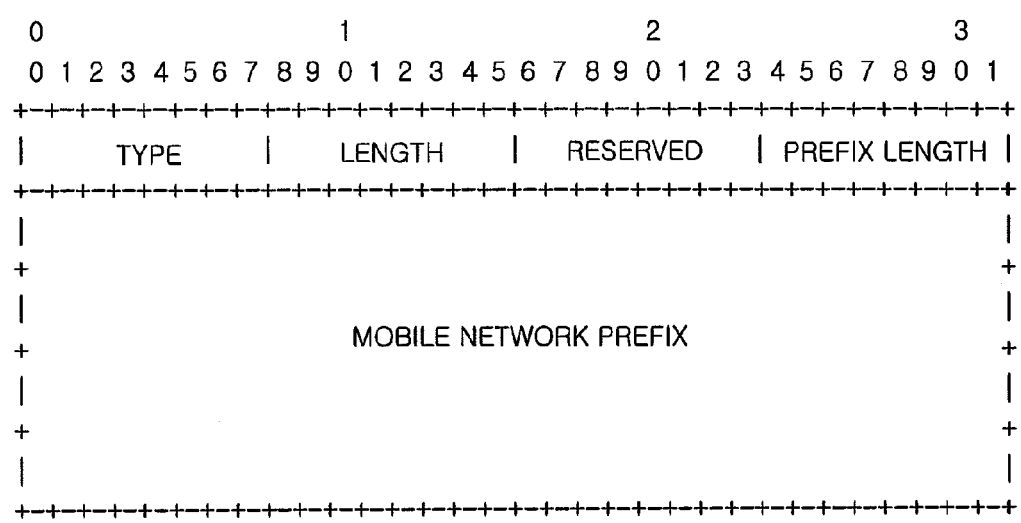
FIG. 7 illustrates a mobile network prefix option adopted in a BU message in accordance with the present invention.

As for the BU message transmitted from the MAG to the LMA 404 in accordance with the present invention, an option for the mobile network prefix is defined as shown in FIG. 7, and the defined option has the same format as the home prefix option of the PMIP6. More specifically, a 'Type' field is not defined in the present invention but will be set up by IANA (Internet Assigned Numbers Authority) later. A 'Length' field denotes the length of an option except the Type and Length fields. And, a 'Reserved' field is not used at present and a 'Prefix Length' field indicates the length of a mobile network prefix.

The method of supporting (managing) a mobile router in a PMIP6 domain in accordance with the present invention may be implemented as codes that can be read by a computer in a computer-readable recording medium. Here, the computer-readable recording medium includes all kinds of recording devices that store data to be read by a computer system.

Examples of the computer-readable recording medium include a ROM, RAM, CD-ROM, magnetic tape, hard disk, floppy disk, flash memory, optical data storage device, and so on. Also, it may be implemented in the form of a carrier wave (e.g., transmission over Internet). Moreover, the computer-readable recording medium may be distributed in the computer system connected through a computer communication network, and may be stored and executed as codes readable in a distributed manner. Furthermore, the font ROM data structure of the present invention may also be implemented as codes to be read by a computer on a computer-readable recording medium such as a ROM, RAM, CD-ROM, magnetic tape, hard disk, floppy disk, flash memory, optical data storage device, etc.

As described above, the present invention proposes a mobile network prefix management technique to assure communications among nodes belonging to a mobile network managed by a mobile router, although the mobile router connected takes a PMIP6 domain as its home network connects, thereby allowing the mobile network to operate without any difficulty even under PMIP6 environment.

While the invention has been shown and described with respect to the preferred embodiments, it will be understood by those skilled in the art that various changes and modification may be made without departing from the scope of the invention as defined in the following claims.

The invention claimed is:

1. A system for managing mobile routers connected to a PMIP6 (proxy mobile internet protocol version 6) domain, comprising:

a plurality of MAGs (mobility access gateways) to which the mobile routers are to be connected;

an LMA (local mobility anchor), connected to the plurality of MAGs, for managing location information of the mobile routers and packet forwarding information of the mobile routers; and a profile server in which profile information of the mobile routers is registered, wherein the plurality of MAGs and the LMA set up forwarding information of a home prefix of a mobile router that is connected to the PMIP6 domain and a mobile network prefix managed by the connected mobile router, based on the profile information of the mobile routers registered in the profile server, wherein the plurality of MAGs determine whether the mobile network prefix exists in the profile information in the profile server, and if the mobile network prefix is in the profile information, the MAGs recognize a mobile node as a mobile router.

2. The system of claim 1, wherein each of the plurality of MAGs:

receives the profile information of a mobile router from the profile server, and sends a registration message for registering a home prefix of the mobile router and a mobile network prefix in the LMA based on the profile information;

sets up forwarding information of the registered home prefix of the mobile router and the mobile network prefix based on the profile information; and establishes a tunnel connecting the LMA and itself as both end-points when a response message to the registration message is received from the LMA.

3. The system of claim 2, wherein the LMA sets up the forwarding information of the registered home prefix and the mobile network prefix based on the registration message provided from said each of the plurality of MAGs, and sends the response message to said each of the plurality of MAGs.

4. The system of claim 1, wherein, when the mobile router moves from an arbitrary MAG to another MAG within the domain, the LMA sends a de-registration message to deregister the registered home prefix of the mobile router and the mobile network prefix set up in the arbitrary MAG.

5. A method for managing mobile routers in a PMIP6 (proxy mobile internet protocol version 6) domain, comprising:
- registering profile information in a profile server, the profile information containing mobile network prefixes managed by mobile routers;
- when an arbitrary mobile router is connected to an arbitrary MAG (mobility access gateway) within the PMIP6 domain, providing profile information of the connected mobile router from the profile server to the MAG;
- extracting a mobile network prefix from the profile information and providing a registration message containing the mobile network prefix from the MAG to an LMA (local mobility anchor), for registering the mobile network prefix;
- setting up, at the LMA, forwarding information of a mobile network managed by the mobile router, and sending a response message in response to the registration message from the LMA to the MAG; and
- establishing a tunnel between the MAG that receives the response message and the LMA, and setting up forwarding information of the mobile network, wherein the step of providing profile information of the connected mobile router from the profile server to the MAG includes requesting the profile server to provide the profile information of the mobile router, and the MAG determines whether a mobile network prefix exists in the profile information provided by the profile server, and if the mobile network prefix is in the profile information, the MAG recognizes a mobile node as a mobile router.

6. The method of claim 5, further comprising:
- when the mobile router moves from the arbitrary MAG to a new MAG, providing profile information of the connected mobile router from the profile server to the new MAG;
- extracting a mobile network prefix from the profile information, and providing a registration message containing the mobile network prefix from the new MAG to the LMA, for registering the mobile network prefix;
- setting up, at the LMA, forwarding information of a mobile network managed by the mobile router, and sending a response message from the LMA to the new MAG;
- establishing a tunnel between the new MAG that receives the response message and the LMA, and setting up forwarding information of the mobile network; and
- sending a de-registration message for deregistering the mobile network prefix of the mobile router from the LMA to the arbitrary MAG.

7. A system for managing a mobile router connected to a PMIP6 (proxy mobile internet protocol version 6) domain, comprising:
- a MAG (mobility access gateway) to which the mobile router is to be connected; and
- an LMA (local mobility anchor), connected to the MAG, for managing location information of the mobile router and packet forwarding information of the mobile router, wherein
- the MAG determines whether a mobile network prefix exists in a profile server, and if the mobile network prefix is in the profile server, the MAG recognizes a mobile node as a mobile router, and, when the mobile router moves from an arbitrary MAG to another MAG within the domain, the LMA sends a de-registration message to deregister the home prefix of the mobile router and the mobile network prefix set up in the arbitrary MAG.

* * * * *